July 6, 1943.  C. HANSON  2,323,324

FINISHING TOOL FOR METAL TURNING

Filed April 3, 1941  2 Sheets-Sheet 1

Inventor
Clifford Hanson

J. S. Murray
Attorney

July 6, 1943.  C. HANSON  2,323,324
FINISHING TOOL FOR METAL TURNING
Filed April 3, 1941   2 Sheets-Sheet 2

Inventor
Clifford Hanson
J. S. Murray
Attorney

Patented July 6, 1943

2,323,324

UNITED STATES PATENT OFFICE 2,323,324

FINISHING TOOL FOR METAL TURNING

Clifford Hanson, Detroit, Mich.

Application April 3, 1941, Serial No. 386,598

22 Claims. (Cl. 82—35)

This invention relates to cutting tools for metal turning and particularly finish forming tools, and is especially applicable to automatic lathe operations as performed by screw machines and the like.

An object of the invention is to so correlate a roller or rollers with the cutter of a metal turning tool as to assure correct engagement of the cutter with the work and avoid flexing of the work under cutting stresses.

Another object is to provide adjustment means for such a roller adapting it to different diameters of work.

Still another object is to provide a cutting tool for screw machine or other turret lathe operations, adapted to automatically compensate for minor inaccuracies in indexing of the work.

A further object is to afford a limited floating movement to a roller installed upon a metal turning tool assuring such roller a full end-to-end bearing on a cylindrical piece of work.

A further object is to afford such a roller a rotative adjustment about an axis transverse to the roller axis to assure parallelism of the roller with a cylindrical work piece.

A further object is to adapt a metal-turning tool to be advanced to cutting position, and to utilize a further advance of a portion of the tool to predeterminedly feed the cutter to the work.

A further object is to set up a cam reaction between relatively movable front and rear portions of a metal-turning tool, whereby relative travel of said portions in one direction will feed a cutter to the work in a substantially transverse direction.

A further object is to employ a spring reacting between said front and rear portions of the improved tool to return them to a normal spaced relation after each cutting operation.

A further object is to provide improved means for very accurately regulating depth of cut of a finishing tool for metal turning.

These and various other objects are attained by the construction hereinafter described and illustrated in the accompanying drawings, wherein.

Figure 1:
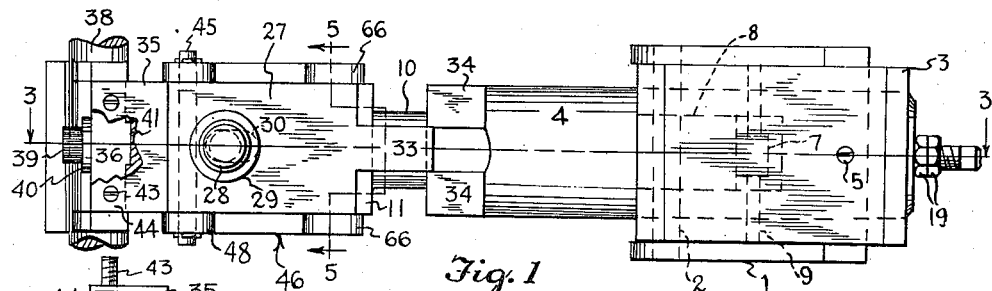
Fig. 1 is a top view of the tool, as engaged with a piece of work.
Figure 2:
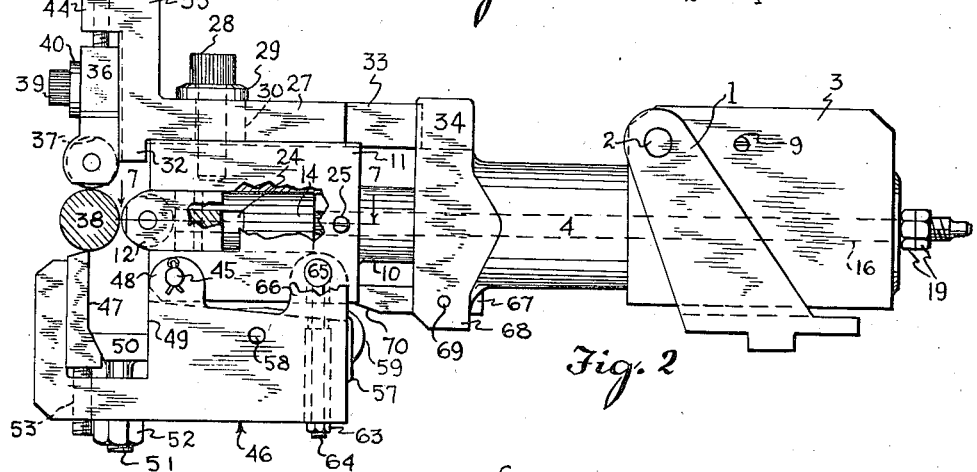
Fig. 2 is a side view of the same.
Figure 3:
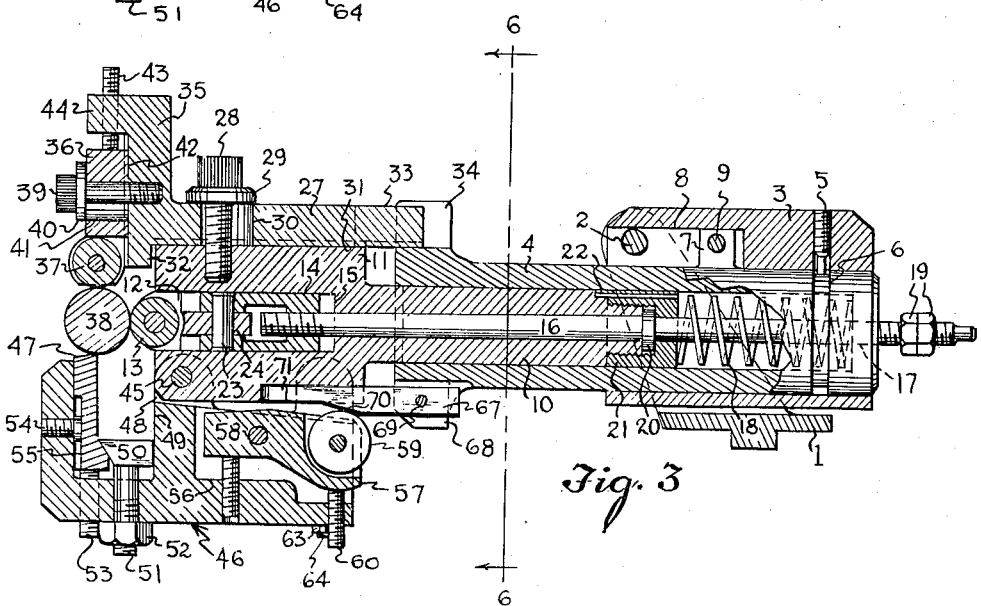
Fig. 3 is a longitudinal vertical section, taken on the line 3—3 of Fig. 1, showing the cutter feed mechanism as positioned when feed is almost completed.
Figure 5:
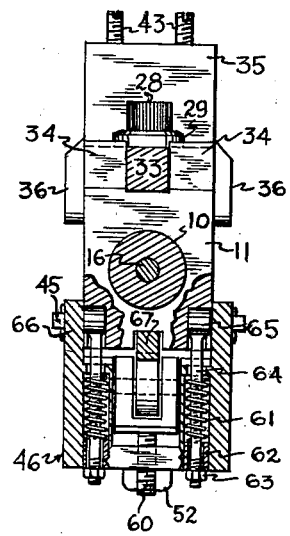
Fig. 5 is a cross sectional view, taken on line 5—5 of Fig. 1.
Figure 4:
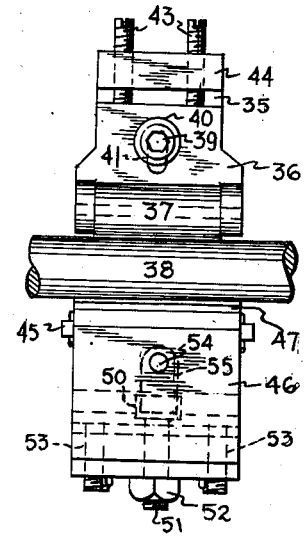
Fig. 4 is a front view of the tool and engaged work.
Figure 6:
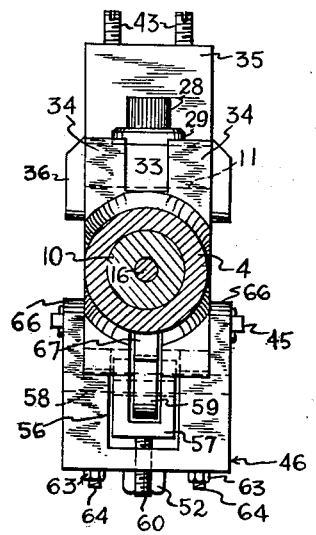
Fig. 6 is a cross section on line 6—6 of Fig. 3.
Figure 7:
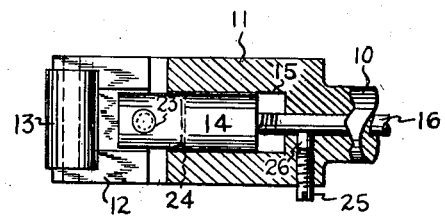
Fig. 7 is a horizontal section, taken on line 7—7 of Fig. 2, and particularly showing the mounting of the lower work engaging roller.

In these views, the reference character 1 designates an adapter serving to mount a cutting tool on one of the usual cross slides (not shown) of a screw machine, so that usual travel of the slide may advance the tool to cutting position. The adapter carries a cross pin 2 on which is swung the supporting block 3 of the tool. Snugly fitted in said block, below and transversely to the pin 2, is a sleeve 4 extending preferably the full length of the block and projecting forwardly beyond the block. Longitudinal play of the sleeve within the block is prevented by a screw 5 set downwardly into the block and having its lower end fitted in an annular groove 6 exteriorly formed in the sleeve. A limited rotational adjustment of the sleeve is afforded by forming it with a lug 7 upwardly projecting into a groove 8 formed in the front portion of the block above the sleeve, said lug being oppositely engaged by a pair of set screws 9 laterally entering the block. By retracting one of such screws and advancing the other, the sleeve may be clamped in selective positions affording a slight angular adjustment.

Slidingly fitted in the front portion of the sleeve 4 is an inner sleeve 10, integrally carrying a rectangular head 11 in front of the sleeve 4 and serving as a shank for said head. The front end portion of the head 11 is grooved from side to side thereof to form a slide guide for a carrier 12 mounting a work-engaging roller 13 having its axis transverse to the tool and intersected by the extended axis of the sleeves 4 and 10. For adjusting the roller 13 forwardly and back, the carrier is equipped with a cylindrical rearwardly projecting feed nut 14 slidably fitted in a socket 15 of the head 11, and a feed screw engaging said nut is formed by the front end portion of a rod 16 extending axially and rotatively through the sleeve 10 and rearwardly beyond the latter through the sleeve 4. The rear end portion of the latter sleeve is reduced to provide an opening 17 freely accommodating said rod, and between said reduced end portion and the sleeve 10 is compressed a coiled spring 18, exerting a forward thrust on the sleeve 10. Response of sleeve 10 to said spring is limited by two nuts 19 threaded on the rear end portion of the rod 16, one acting as a lock nut for the other and the latter normally abutting the rear end of the sleeve 4. The rod 16 is restrained from sliding in the sleeve 10 by welding or otherwise rigidly mounting on said rod a collar 20 and confining said collar between the sleeve 10 and a cap 21 threaded on the reduced rear end portion of such sleeve. Said cap is safeguarded from unscrewing by interengaging it with the sleeve by a locking pin 22.

It is desirable to afford the roller 13 a slight angular play about an axis transverse to said roller and also to the rod 16. Thus the carrier is swiveled on a rivet 23 secured in the feed nut 14, which is formed separately from the carrier, a lug 24 being rearwardly extended from the carrier for engagement by the rivet, and the forward end of the nut being slotted to accommodate said lug. Clearance between said lug and end wall of the feed nut slot is restricted to predeterminedly limit angular play of the carrier.

To accurately maintain a desired forward-and-back adjustment of the roller carrier in the head 11, it is necessary to normally restrain the adjusting rod 16 from rotation. For this purpose, the head 11 has a clamping screw 25 laterally set into its rear end portion, such screw taking effect on the rod through a suitable shoe 26 formed of some fairly soft metal, such as brass.

Surmounting the head 11 is a plate 27, normally rigidly clamped in place by a screw 28 acting on the plate through a washer 29. The plate is formed with a slot 30 for said screw, being thus afforded a forward and back adjustment. A gib 31 on the plate is set into the head 11 to guide the plate in its adjustment and prevent any other relative movement of the plate and head. It is preferred to limit rearward adjustment of the plate by a lug 32 integrally depending from the front end of the plate and engageable with the front face of the head 11. Said plate prevents any rotation of the sleeve 4 with relation to the head 11, being formed for this purpose with a rearwardly projecting tongue 33 engaged between a pair of laterally spaced guide lugs 34 upstanding from the front end of said sleeve.

An upward extension 35 on front end of the plate 27 serves to mount a carrier 36 for a second work-engaging roller 37, having its axis parallel to that of the work, shown at 38. A clamping screw 39, acting through a washer 40, rigidly mounts the carrier 36 on the front face of the extension 35, which is slotted at 41 to afford the carrier and its roller a limited vertical adjustment. A gib 42 on the carrier is set into the extension to accurately guide the carrier in said adjustment and restrain it from any other movement relative to the extension. Upthrust exerted on the roller 37 by the work is resisted by a pair of stop screws 43 set into the forwardly projecting top portion 44 of the extension 35 and engaging the upper edge of the carrier 36.

Transversely set into the lower front portion of the head 11 is a pin 45, pivotally mounting a holder 46 for a cutter 47. Said holder lies beneath the head and is formed with a pair of upstanding lugs 48 engaging the ends of the pin 45. A portion of the holder 46 projects forwardly beyond the head 11 and is channeled from side to side of said portion as indicated at 49 to receive said cutter and a securing means for same. Such means comprises the head 50 of a clamping screw 51 extending downwardly through the holder 46, and carrying a clamping nut 52 seated against the bottom face of the holder. The head 50 fits non-rotatively between the rear wall of the channel 49 and lower portion of the cutter, such portion being of increased thickness and presenting a bevelled face to the overlying and correspondingly bevelled front face of the head 50. Thus the cutter may be clamped securely against the front wall of the channel 49 and also be drawn firmly down to engage an underlying seat. Such seat is formed by a pair of screws 53 upwardly set into the holder 46 and serving to adjust the cutter vertically. A pin 54 rigidly set into the front wall of the channel 49 is headed within a vertical groove 55 formed in the front face of the cutter, properly centering the latter, while affording any slight angular adjustment necessary to render the cutting edge parallel with the work. The cutting edge and the axis of the roller 37 lie substantially in a plane transverse to the extended axis of the sleeves 4 and 10.

Rearwardly of its channel 49, the holder 46 is formed with an upwardly opening groove 56, extended lengthwise of the holder, and within said groove is fitted an arm 57, pivoted approximately midway of its length on a pin 58 transversely mounted in the holder. Journaled transversely of said arm within its slotted rear end portion is a roller 59, projecting slightly upwardly and rearwardly from the arm. The pivotal position of the arm 57 is regulated and maintained by a pair of clamping screws 60, upwardly set into the holder 46 and respectively engaging the arm forwardly and rearwardly of its pivot. By loosening one of said screws and then tightening the other, the pivotal position of the arm may be varied to adjust the roller 59 vertically with great accuracy. The rear end of the holder 46 is urged yieldably upwardly by a pair of coiled springs 61 set into sockets formed in the holder at apposite sides of the groove 56. Said springs are compressed between annular shoulders formed in the upper ends of said sockets and bushings 62 retained by nuts 63 on the lower end portions of pins 64 which project downwardly into said sockets from the head 11. The upper ends of said pins carry heads 65 swiveled in the head 11 about an axis transverse to said head, whereby the pins are afforded a swinging movement necessary to accommodate them to swinging of the holder 46 on its pivot pin 45. To guide the holder in such swinging movement, a pair of lugs 66 are extended upwardly from the rear end of the holder 46 and engage opposite sides of the head 11. Upon the roller 59 is adapted to ride a cam arm 67 forwardly projecting from the sleeve 4 and having its rear end engaged between a pair of spaced lugs 68 downwardly projecting from the front end of said sleeve, said arm being pivoted on a pin 69 jointly carried by said lugs. The bottom face of the arm 67 is formed with a gradual cam incline 70, spaced from both ends of the arm, and said incline is adapted to act on the roller to predeterminedly force the rear end of the holder 46 downwardly, as said arm is advanced by the sleeve 4, in a travel relative to the holder 46. The arm 67, as it is fed forwardly, is accommodated within a groove 71 formed in the bottom face of the holder 11, and seats upwardly against said face in camming the rear end of the cutter holder downward.

In use of the described tool, as applied to an automatic screw machine, it will be understood that the work 38 is carried and rotatively driven by a spindle (not shown) of said machine. A number of spindles are carried by a turret which, between operations, undergoes a step-by-step rotation, so that pieces of work, respectively carried by the respective spindles, may be each subjected to several successive tooling operations. As each piece of work is established in a tooling position or station, there is advanced toward the work piece a tool mounted, by a suitable adapter on a cross slide of the machine.

When my improved tool is advanced by its adapter 1, engagement of the roller 13 with the work, as shown, limits advancement of the head 11, and thereby positions the cutter 47 in its initial working position below the work and engages the roller 37 with and above the work. During described advancement, the head 11 is maintained by the spring 18 in a maximum forwardly spaced relation to the sleeve 4. The adapter, together with the sleeve 4, undergoes a predetermined further advance after the head 11 is halted, whereby said sleeve approaches said head and the spring 18 is progressively compressed. In the course of this further advance, the cam arm 67 advances over the roller 59 and the incline 70 of said arm forces said roller progressively downward, together with the rear end portion of the holder 46, this downward movement being pivotal on the pin 45. Thus the front end of said holder and the cutter carried thereby are predeterminedly raised, at a predetermined rate, to effect a desired cutting feed. The roller 13 opposes the thrust exerted on the work by the cutter feed and the roller 37 resists reaction of the work to cutting stresses, so that any flexing of the work from its proper axis of rotation is avoided. Such a safeguard against flexure is particularly desirable in tooling work having a considerable extent from the chuck (not shown) which mounts it in a spindle.

Upon completion of a cutting operation, the tool is retracted similarly to any screw machine tool, and in the course of retraction, the spring 18 again establishes the head 11 in its maximum spaced relation to the sleeve 4.

The cutter is adapted to different diameters of work by raising or lowering its seating screws 53, and for the same purpose the roller 37 may be adjusted, after loosening the carrier-clamping screw 39, by raising or lowering the stop screws 43. The roller 13 is moved forwardly or back to suit the work diameter by rotating the rod 16 and thus shifting the nut 14 which serves to actuate the carrier 12.

Adjustment of the roller 59 by means of the set screws 60 serves to afford a highly accurate control of the depth of cut. It is to be noted that said cut is not necessarily the maximum that is afforded by the incline 70 of the cam arm, since the cutter-feeding advance of said arm and of its supporting sleeve 4 may be halted at any desired point of engagement of the cam incline with the roller. Thus the cut taken may be a very fine one, if desired.

It is a highly desirable feature of the described tool that it affords automatic compensation for inaccurate indexing of spindle turret of a screw machine, unless the inaccuracies are excessive. In present practice it is necessary that the several pieces of work carried by the spindles be successively established in a definite position, since the tooling can be properly performed only with reference to that position. My improved tool is controlled, as to its cutting position by the work, itself, and hence will accommodate itself to the position assumed by work pieces, whether or not there is a variance in the tooling position of the several pieces. Thus there will be avoided the spoiling of work or inferior tooling thereof, that occasionally occurs in present practice due to inaccurate indexing.

The pivotal mounting of the adapter on pin 2 affords the entire tool a limited floating movement, up and down, to adjust itself vertically to the work as the rollers 13 and 37 encounter the latter.

The rotational adjustment of the sleeve 4, effected by the set screws 9, permits correction of any deviation of the head 11 from a position affording the rollers 13 and 37 definite parallelism with the work.

The forward and back adjustment of the roller 37 afforded by slotting the plate 27 to receive the clamping screw 28 permits said roller to be properly opposed to cutting edges of cutters of different thickness, since characteristics of the cutters employed will vary for different jobs.

While the improved tool has been described, as applied to a screw machine, it is applicable to practicably any machine involving lathe operations and particularly machines in which rotating work has an indexing travel with respect to a cutting tool.

Said tool avoids chatter marks on the work, and permits of working to more accurate limits and achieves a smoother finish than tools heretofore designed for like work.

What I claim is:

1. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting roller carried by the head, a cutter carried by the head and positioned by the roller to take effect on the work, and coacting means on the support and head employing advance of the support relative to the head to feed the cutter predeterminedly to the work.

2. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting roller carried by the head, a cutter carried by the head and positioned by the roller to take effect on the work, and coacting means on the support and head employing advance of the support relative to the head to feed the cutter predeterminedly to the work, said head having a shank slidable in said support and said spring being housed within said support.

3. In a cutting tool for rotating work as set forth in claim 1, means for adjusting said roller forwardly and back on the head to suit the work diameter and for holding it selectively adjusted.

4. In a cutting tool for rotating work as set forth in claim 1, a spring on said head, normally retracting the cutter to the initial position of its cutting feed.

5. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting roller carried by the head, a cutter carried by the head and positioned by the roller to take effect on the work, and a second work-engaging roller carried by the head and spaced from the cutter in the direction of cutter feed.

6. In a cutting tool for rotating work as set forth in claim 5, means for adjusting the second roller to and from the cutter and for holding it selectively adjusted to accommodate it to different diameters of work.

7. In a cutting tool for rotating work as set forth in claim 5, means for adjusting the second roller to and from the cutter to accommodate it to different diameters of work and for adjusting it in the direction of sliding travel of the head for coordination with different cutters.

8. A cutting tool for rotating work, adapted for forward and back actuation to and from its cutting position, comprising a support, a head slidable forward and back on the support, a spring reacting between the support and head and normally establishing the head at the limit of its forward travel on the support, means establishing said limit, a work-abutting roller carried by the head, a holder pivoted on the head, a cutter mounted on said holder forwardly of its pivot, a spring reacting between said head and holder to normally retract the cutter, and coacting means on the support and cutter holder for feeding the cutter predeterminedly to the work responsive to advance of the support relative to the head.

9. A cutting tool for rotating work as set forth in claim 8, said coacting means including a cam element.

10. A cutting tool for rotating work, as set forth in claim 8, said co-acting means including a roller, and an arm riding against and presenting a cam inclined to such roller.

11. A cutting tool for rotating work adapted for forward and back actuation to and from its cutting position, comprising a support, a head mounted on said support for forward and back travel, means yieldably urging the head to the forward limit of said travel, means establishing said limit, means on the head for abutting the work to limit forward actuation of the tool as a whole, a holder pivoted on the head, a cutter mounted on said holder forwardly on its pivot, a roller journaled on said holder rearwardly of its pivot, a cam element on the support taking effect on said roller to pivotally actuate the holder and feed the cutter to the work, and a spring reacting between the head and holder to normally retract the cutter.

12. In a cutting tool for rotating work as set forth in claim 11, means for adjusting said roller to vary its response to said cam element.

13. In a cutting tool for rotating work as set forth in claim 11, an arm pivoted on said holder and journaling said roller, and means for pivotally adjusting said arm to vary response of said holder to the cam element.

14. A cutting tool for rotating work comprising a support and head connected for unitary advance toward the work, and relatively movable in the direction of such advance, a spring reacting between the support and head to urge the head toward the work, means limiting response of the head to said spring, a roller for abutting the work to limit unitary advance of the tool, a carrier for said roller pivoted on the head to allow the roller to adjust itself into parallelism with the work, a cutter having a feeding travel on the head substantially transverse to its travel toward the work, and coacting means on the support and head for actuating the cutter in said travel responsive to advance of the support relative to the head.

15. A cutting tool for rotating work comprising a support and head connected for unitary advance toward the work, and relatively movable in the direction of such advance, a spring reacting between the support and head to urge the head toward the work, means limiting response of the head to said spring, a roller for abutting the work to limit unitary advance of the tool, a carrier for said roller, a feed nut carried by and rearwardly projecting from the carrier, a feed screw engaging said feed nut, means restraining said feed screw from lengthwise travel in the head, a cutter movable on the head to take effect on the work, and coacting means on the support and head for actuating the cutter in said movement responsive to advance of the support relative to the head.

16. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting element carried by the head, a cutter carried by the head and positioned by said element to take effect on the work, and coacting means on the support and head employing advance of the support relative to the head to feed the cutter predeterminedly to the work.

17. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting element carried by the head, a cutter carried by the head and positioned by said element to take effect on the work, and coacting means on the support and head employing advance of the support relative to the head to feed the cutter predeterminedly to the work, said head having a shank slidable in said support and said spring being housed within said support.

18. A cutting tool for rotating work adapted for forward and back actuation to and from its cutting position, comprising a support, a head slidable forward and back on the support, a spring reacting between the support and head and normally establishing the head at its forward limit of travel on the support, means establishing said limit, a work-abutting element carried by the head, a cutter carried by the head and positioned by said element to take effect on the work, coacting means on the head and support for feeding the cutter to the work in a direction substantially transverse to sliding travel of the head, and a second work-engaging element carried by the head and spaced from the cutter in the direction of cutter feed.

19. A cutting tool for rotating work, adapted for forward and back actuation to and from its cutting position, comprising a support, a head slidable forward and back on the support, a spring reacting between the support and head and normally establishing the head at the limit of its forward travel on the support, means establishing said limit, a work-abutting element carried by the head, a holder pivoted on the head, a cutter mounted on said holder forwardly of its pivot, a spring reacting between said head and holder to normally retract the cutter, and coacting means on the support and cutter holder for feeding the cutter predeterminedly to the work responsive to advance of the support relative to the head.

20. A cutting tool for rotating work adapted for forward and back actuation to and from its cutting position, comprising a support, a head mounted on said support for forward and back travel, means yieldably urging the head to the forward limit of said travel, means establishing said limit, means on the head for abutting the work to limit forward actuation of the head as the tool undergoes unitary advance, a holder pivoted on the head, a cutter mounted on said holder forwardly on its pivot, a cam element on the support taking effect on said holder rearwardly of its pivot to pivotally actuate the holder and feed the cutter to the work, and a spring reacting between the head and holder to normally retract the cutter.

21. A cutting tool for rotating work comprising a support and head connected for unitary advance toward the work, and relatively movable in the direction of such advance, a spring reacting between the support and head to urge the head toward the work, means limiting response of the head to said spring, an element having a face for abutting the work to limit advance of the head as the tool undergoes unitary advance, a carrier for said element pivoted on the head to allow said element to adjust itself to effect parallelism of said face with the work, a cutter having a feeding travel on the head substantially transverse to its travel toward the work, and coacting means on the support and head for actuating the cutter in said travel responsive to advance of the support relative to the head.

22. A cutting tool for rotating work comprising a support and head connected for unitary advance toward the work, and relatively movable in the direction of such advance, a spring reacting between the support and head to urge the head toward the work, means limiting response of the head to said spring, an element for abutting the work to limit advance of the head as the tool undergoes unitary advance, a carrier for said element, a feed nut carried by and rearwardly projecting from the carrier, a feed screw engaging said feed nut, means restraining said feed screw from lengthwise travel in the head, a cutter movable on the head to take effect on the work, and coacting means on the support and head for actuating the cutter in said movement responsive to advance of the support relative to the head.

CLIFFORD HANSON.